(12) United States Patent
Uchimi et al.

(10) Patent No.: US 10,721,863 B2
(45) Date of Patent: Jul. 28, 2020

(54) ELECTRIC MOWER

(71) Applicant: HONDA MOTOR CO., LTD., Tokyo (JP)

(72) Inventors: Makoto Uchimi, Wako (JP); Keisuke Muraoka, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 353 days.

(21) Appl. No.: 15/824,080

(22) Filed: Nov. 28, 2017

(65) Prior Publication Data
US 2018/0146620 A1    May 31, 2018

(30) Foreign Application Priority Data

Nov. 30, 2016  (JP) ................. 2016-232472

(51) Int. Cl.
| | | |
|---|---|---|
| A01D 34/78 | (2006.01) | |
| A01D 34/81 | (2006.01) | |
| A01D 69/02 | (2006.01) | |
| B60L 58/26 | (2019.01) | |
| B60L 50/60 | (2019.01) | |

(52) U.S. Cl.
CPC ............ *A01D 34/78* (2013.01); *A01D 34/81* (2013.01); *A01D 69/02* (2013.01); *B60L 50/66* (2019.02); *B60L 58/26* (2019.02)

(58) Field of Classification Search
CPC ...... A01D 34/78; A01D 34/81; A01D 34/828; A01D 34/6812; A01D 69/02; B60L 1/003; B60L 50/66; B60L 58/26
USPC ........... 56/11.9, 17.2, 320.1, 16.7, 16.8, 202, 56/320.2, 12.8
See application file for complete search history.

(56) References Cited

U.S. PATENT DOCUMENTS

| | | | |
|---|---|---|---|
| 5,638,668 A | 6/1997 | Kallevig et al. | |
| 5,910,091 A * | 6/1999 | Iida .................. | A01D 34/78 56/16.7 |
| 8,191,343 B1 * | 6/2012 | Hauser ............... | A01D 69/02 56/11.9 |
| 8,207,693 B2 * | 6/2012 | Hauser ............... | B60L 15/38 318/34 |
| 8,227,948 B1 * | 7/2012 | Fox .................. | H02K 1/06 310/50 |

(Continued)

FOREIGN PATENT DOCUMENTS

| | | |
|---|---|---|
| EP | 0 829 196 A3 | 5/1998 |
| FR | 2 404 385 A1 | 4/1979 |

OTHER PUBLICATIONS

Extended European Search Report issued in European Application No. 17203836.6 dated Apr. 25, 2018, 6 pages.

*Primary Examiner* — Robert E Pezzuto
(74) *Attorney, Agent, or Firm* — Armstrong Teasdale LLP

(57) ABSTRACT

An electric mower comprises a blade housing (2b) defining a cavity (7) opening out downward and a vertical passage (32) extending centrally upward from the cavity, a metallic motor support plate (38) attached to a part of the blade housing defining an upper end of the vertical passage and provided with an extension (42) extending beyond the vertical passage in a horizontal direction, an electric motor (8) attached to the motor support plate and having an output shaft (64) extending downward through an opening formed in the motor support plate, a blade (3) attached to a lower end of the output shaft and covered by the blade housing, and a control unit (10) mounted on an upper surface of the extension for controlling the electric motor.

10 Claims, 3 Drawing Sheets

(56) References Cited

U.S. PATENT DOCUMENTS 9,787,225 B2 * 10/2017 Lucas .................. A01D 69/025
2003/0037525 A1 2/2003 Iida et al.

* cited by examiner

ELECTRIC MOWER

TECHNICAL FIELD

The present invention relates to an electric mower provided with a control unit for controlling a motor of the mower.

BACKGROUND ART

An electric mower is provided with a blade motor for rotating a cutting blade, an electric control unit for controlling the blade motor, and a battery for powering the blade motor and the control unit. In such an electric mower, it is necessary to remove heat generated from the blade motor and the control unit. See US2003/037525A1, for instance. The mower may also be provided with a travel motor for driving the wheels, but the power of the blade motor may also be used for driving the wheels without requiring a travel motor.

The electric mower disclosed in US2003/037525A1 is provided with a cover member that covers the blade motor and the battery. The battery is positioned above the blade motor, and a control unit is interposed between the battery and the blade motor. The cover member defines an air inlet in a lower front part thereof, and air outlet in a rear part thereof. The air admitted from the air inlet is passed along the both sides of the blade motor and the battery in order to cool such parts.

When high performance electric motors consisting of brushless motors are used, it is highly important to remove heat from the control unit as well as from the electric motor. In the case of the electric mower disclosed in US2003/037525A1, because the control unit is vertically interposed between the electric motor and the battery, the air flow passing along both sides of these components may not produce a desired cooling effect.

In view of such a problem of the prior art, a primary object of the present invention is to provide an electric mower configured to favorably remove heat from an electric motor and a control unit thereof.

The present invention achieves such an object by providing an electric mower (1), comprising: a blade housing (2b) defining a cavity (7) opening out downward and a vertical passage (32) extending centrally upward from the cavity; a metallic motor support plate (38) attached to a part of the blade housing defining an upper end of the vertical passage and provided with an extension (42) extending beyond the vertical passage in a horizontal direction; an electric motor (8) attached to the motor support plate and having an output shaft (64) extending downward through an opening formed in the motor support plate; a blade (3) attached to a lower end of the output shaft and covered by the blade housing; and a control unit (10) mounted on an upper surface of the extension for controlling the electric motor.

The heat generated in the electric motor and the control unit is transmitted to the motor support plate, and is dissipated from the surface of the motor support plate so that the electric motor and the control unit can be favorably cooled.

A plurality of fins (84) may be provided on at least a part of a lower surface of the motor support plate.

By thus increasing the surface area of the motor support plate, the electric motor and the control unit can be particularly favorably cooled.

The fins may be provided on at least a part of a lower surface of the extension of the motor support plate.

The fins can be formed in a relative exposed part of the motor support plate without interfering with other components of the mower so that the cooling effect may be optimized.

The control unit may be attached to an upper surface of the part of the extension provided with the fins.

Since the control unit is typically most sensitive to overheating, it is advantageous to attach the control unit to the upper surface of the part of the extension provided with the fins.

According to a preferred embodiment of the present invention, the mower further comprises an upper housing (2a) attached to an upper end of the blade housing to define an air passage (A) in cooperation with an upper surface (30) of the blade housing; and the air passage communicates with the atmosphere via an air inlet (21) defined at least partly by the upper housing, and includes a space defined between the upper surface of the blade housing and at least a part of a lower surface of the extension.

Thereby, the fresh air admitted from the air inlet can be conducted through the space defined between the upper surface of the blade housing and at least a part of a lower surface of the extension so that the motor support plate, in particular the extension thereof, can be favorably cooled by the fresh air.

Preferably, fins aligning with a direction toward the air inlet are provided on at least a part of the lower surface of the extension.

Thereby, the cooling effect of the fins can be maximized.

The mower may further comprise a motor cover (67) attached to an upper surface of the motor support plate to define a chamber receiving the electric motor and the control unit therein.

Thereby, the electric motor and the control unit are protected from foreign matters such as dust and moisture so that the durability of the mower can be maximized. The motor cover may be made of plastic material so that the weight increase may be minimized.

Preferably, the air passage communicates with the vertical passage via a gap defined between the motor support plate and the upper surface of the blade housing.

Thereby, the air admitted from the air inlet is drawn into the cavity by the negative pressure created by the rotation of the blade so that a large amount of air may be passed through the air passage, and the electric motor and the control unit can be favorably cooled.

Preferably, the motor support plate is attached to the upper surface of the blade housing via a plurality of rubber bushes so that the rubber bushes create the gap by spacing the motor support plate from the upper surface of the blade housing.

The rubber bush not only insulate the vibrations of the electric motor from the remaining part of the mower but also contributes to the creation of the gap communicating the air passage with the cavity without requiring any other special component parts.

The electric motor may consist of a permanent magnet motor including a stator and a rotor, the stator being substantially in direct contact with the motor support plate.

Thereby, the heat generated in the electric motor can be favorably conducted to the motor support plate.

Preferably, the motor support plate is provided with an upper annular boss formed on an upper surface of the motor support plate, and a top end surface of the upper annular boss is substantially in direct contact with the stator.

Thereby, the heat transfer between the stator and the motor support plate can be maximized.

Preferably, the motor support plate is further provided with a lower annular boss formed on a lower surface of the motor support plate, and the output shaft of the motor is supported by a pair of bearings provided in the opening of the motor support plate in an axially spaced apart relationship.

By supporting the output shaft of the electric motor by two bearings that are axially spaced from each other, the rotor of the motor can be supported relatively to the stator in a stable manner by firmly resisting the tilting movement of the output shaft.

The present invention thus provides an electric mower configured to favorably remove heat from an electric motor and a control unit thereof.

BRIEF DESCRIPTION OF THE DRAWING(S)

DESCRIPTION OF THE PREFERRED EMBODIMENT(S)

A preferred embodiment of the present invention is described in the following with reference to the appended drawings.

Figure 1:
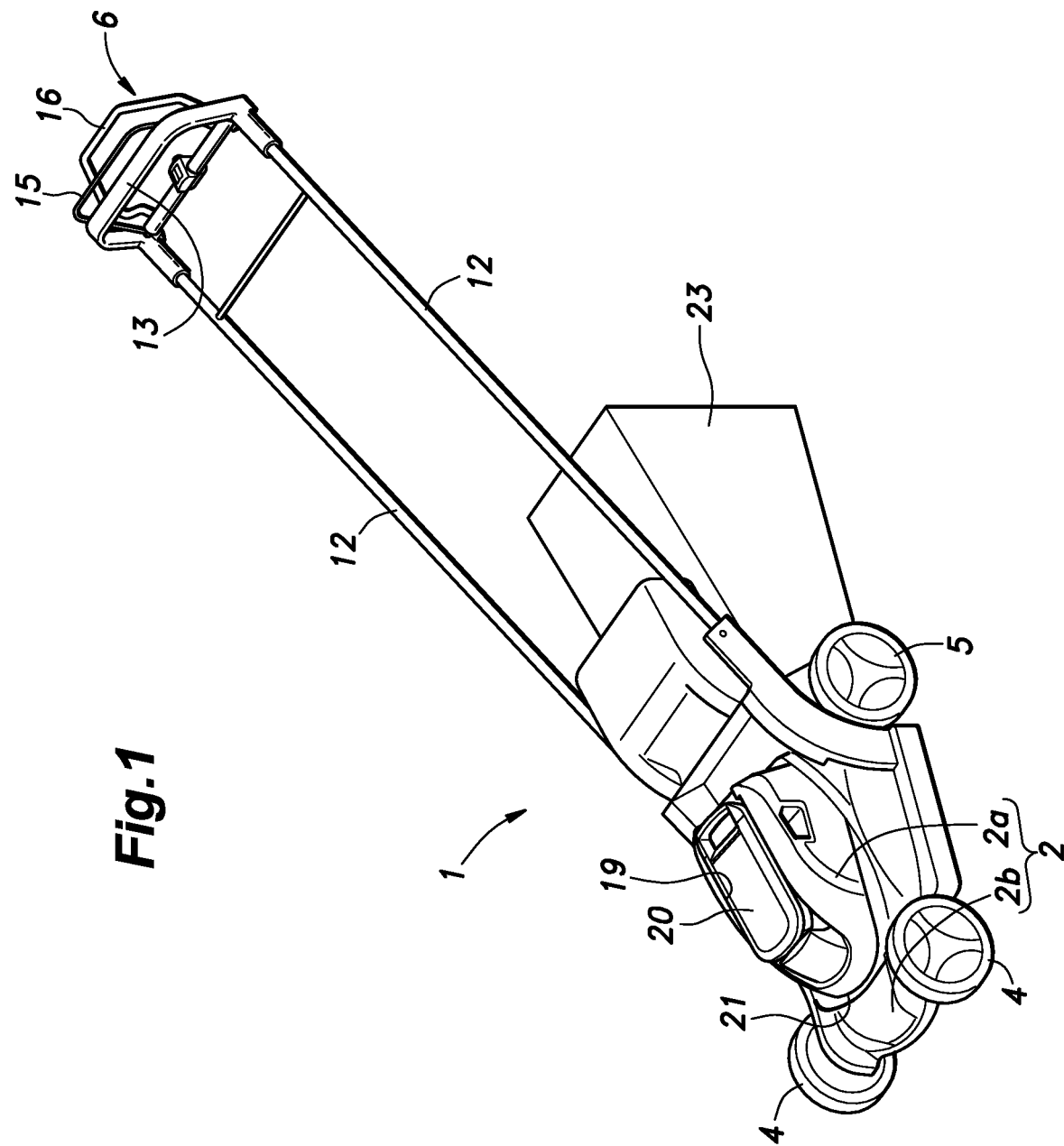
FIG. 1 is a perspective view of an electric mower according to the present invention.
Figure 2:
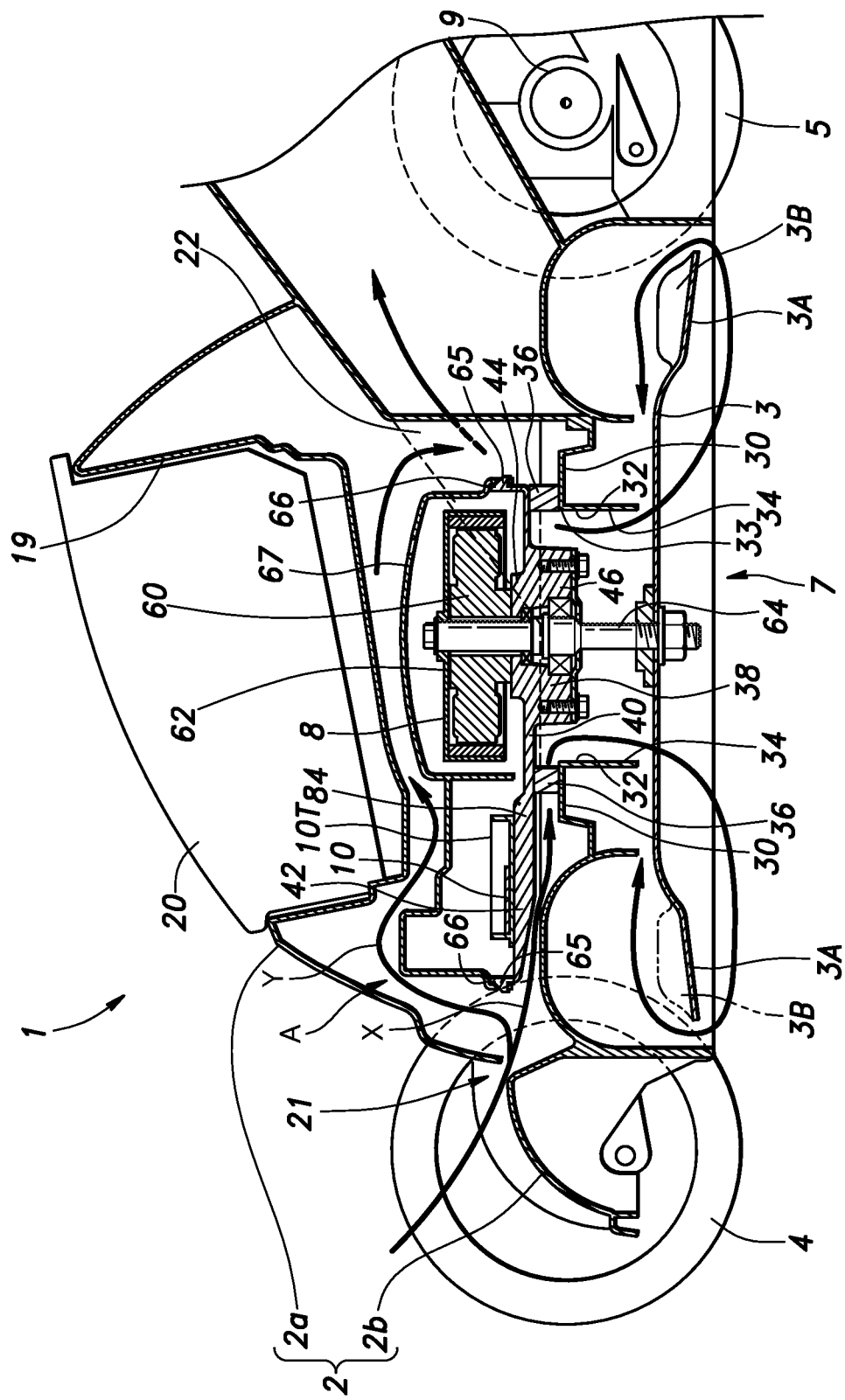
FIG. 2 is a vertical sectional view of the electric mower.
Figure 3:
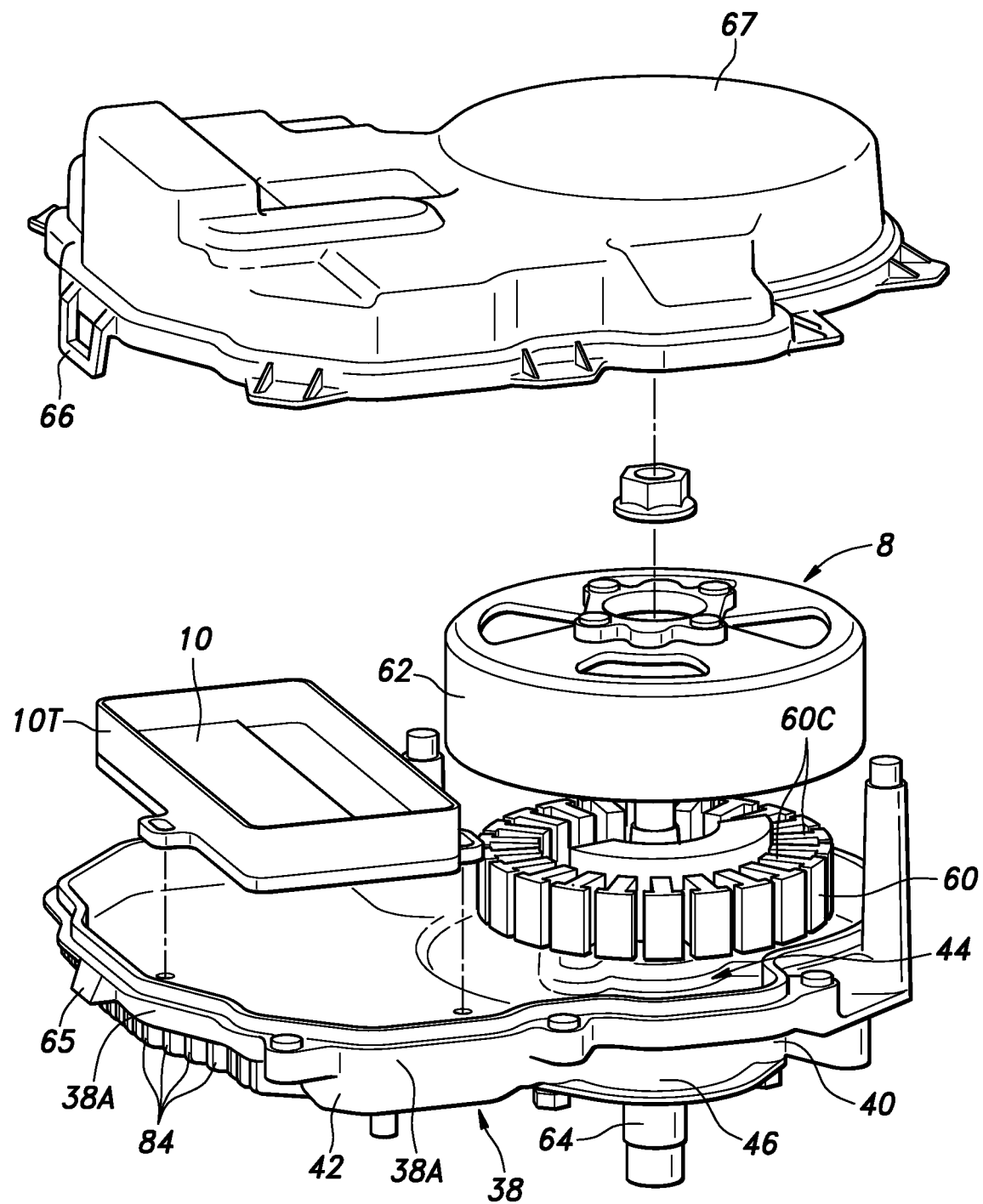
FIG. 3 is an exploded perspective view of a part of the electric mower.

As shown in FIGS. 1 and 2, the electric mower 1 according to the present embodiment includes a main body 2, a blade 3 rotatably supported in a cavity 7 defined in a lower part of the main body 2, a pair of front wheels 4 supported by the main body 2, a pair of rear wheels 5 supported by the main body 2, and a handle 6 extending rearward and upward from the main body 2. A blade motor 8 having the blade 3 coupled to an output shaft 64 thereof and a travel motor 9 for driving the rear wheels 5 are supported by the main body 2. Both the blade motor 8 and the travel motor 9 consist of electric motors, and the main body 2 is provided with an electric control unit 10 for controlling these motors.

The handle 6 is provided with a pair of side rods 12 extending rearward and upward from either side end of a rear part of the main body 2, and a cross rod 13 extending between the rear ends of the side rods 12. The cross rod 13 of the handle 6 is provided with a travel lever 15 for operating the travel motor 9 and a blade lever 16 for operating the blade motor 8.

As shown in FIG. 2, the main body 2 is provided with a blade housing 2b which forms a lower part of the main body 2, and defines the cavity 7 that opens out downward, and an upper housing 2a attached to an upper end of the blade housing 2b to define an air passage A in cooperation with an upper surface of the blade housing 2b. The blade motor 8, the travel motor 9 and the electric control unit 10 are supported by the blade housing 2b, and are received in the air passage A. The upper end of the upper housing 2a is recessed downward to define a recess 19 for removably receiving a battery 20 for powering the blade motor 8, the travel motor 9 and the electric control unit 10.

The lower edge of the front wall, the left side wall and the right side wall of the upper housing 2a is spaced from the opposing surface of the blade housing 2b thereby defining a laterally elongated air inlet 21 which communicates the air passage A with the atmosphere. The air inlet 21 is generally symmetric about a central vertical plane of the mower 1 extending in the fore and aft direction.

A chute 22 extends from the cavity 7 in a tangential direction, and opens out at the rear end of the blade housing 2b, and a grass bag 23 (FIG. 1) is connected to the chute 22 at the rear end of the blade housing 2b. The grass clippings cut by the blade 3 are discharged rearward from the cavity 7 through the chute 22 and collected in the grass bag 23. The grass bag 23 is made of a net that freely passes the air blown rearward by the rotating blade 3, but traps the grass clippings carried by the flow of the air therein.

The blade housing 2b is provided with a horizontal annular upper surface 30 in a central part thereof, and is provided with a cylindrical part 34 extending downward from the inner periphery of the annular upper surface 30 to define a vertical passage 32. An output shaft 64 of the blade motor 8 is coaxially passed through the vertical passage 32. The part of the upper wall of the blade housing 2b defining the annular upper surface 30 is provided with a plurality of bolt holes arranged in the circumferential direction at a regular interval.

Rubber bushings 36 are attached to the annular upper surface 30 of the blade housing 2b by threaded bolts passed through the bolt holes, and a motor support plate 38 is supported by these rubber bushings 36 in a horizontal orientation. The motor support plate 38 includes a substantially disk-shaped main body 40 disposed substantially concentrically to the annular upper surface 30, and a horizontal extension 42 extending forward from the circular main body 40 beyond the vertical passage 32. The main body 40 is provided with a central bore, a concentric upper annular boss 44 projecting upward and having a planar horizontal upper surface, and a lower annular boss 46 projecting downward in a concentric manner.

The motor support plate 38 is preferably made of a metal having a high thermal conductivity, such as copper, aluminum, iron and an alloy based on such metals. The motor support plate 38 of the present embodiment is made of aluminum.

The blade motor 8 consists of a per se known outer rotor permanent magnet motor that includes an inner stator 60 having a stator core and a plurality of coils 60C wound around respective teeth of the stator core, and an outer rotor 62 having an inverted cup shaped yoke and a plurality of permanent magnets attached to the inner circumferential surface thereof at a regular interval. The output shaft 64 is centrally secured to the bottom wall of the yoke and extends downward through a central opening of the inner stator 60. In the illustrated embodiment, the inner stator 60, in particular the stator core and/or the coils 60C thereof, is in direct contact with the upper surface of the upper annular boss 44 so that a favorable thermal conduction may be effected between the inner stator 60 and the motor support plate 38.

The central opening of the motor support plate 38 is fitted with a pair of bearings in an axially spaced apart relationship so that the tilting of the output shaft 64 of the blade motor 8 can be favorably restrained. This is made possible by increasing the thickness of the motor support plate 38 by the provision of the two annular bosses 44 and 46.

A control unit support tray 10T defining a recess opening out upward is attached to the upper surface of the extension 42 of the motor support plate 38, and the control unit 10 essentially consisting of a circuit board is attached to the bottom surface of the control unit support tray 10T. The control unit 10 includes an input port for receiving signals from the travel lever 15 and the blade lever 16 and an electronic control circuit (ECU) including motor drivers for controlling the operation of the blade motor 8 and the travel motor 9 according to the signals supplied thereto via the input port. The control unit 10 is connected to the battery 20 for receiving a supply of electric power. The control unit 10 controls the operation of the blade motor 8 and the travel motor 9 by processing the signals from the travel lever 15 and the blade lever 16 according to a prescribed control flow.

A plurality of fins 84 project from the lower surface of the extension 42, and extend in the fore and aft direction. The lower ends of the fins 84 are spaced from the upper surface of the blade housing 2b so that a space forming a part of the air passage A is created between the lower surface of the extension 42 and the upper surface of the blade housing 2b.

The motor support plate 38 is provided with a peripheral flange 38A projecting upward and extending substantially along the entire outer periphery of the motor support plate 38. The front surface and the rear surface of the peripheral flange 38A are provided with engagement claws 65, respectively. A motor cover 67 is attached to the upper edge of the peripheral flange 38A via engagement features 66 provided in the front end and the rear end of the motor cover 67, respectively, configured to be engaged by the corresponding engagement claws 65 of the peripheral flange 38A. Thus, the motor cover 67 defines a chamber accommodating the control unit 10 and the blade motor 8 in cooperation with the motor support plate 38.

The blade 3 which is attached to the lower end of the output shaft 64 is provided with a pair of cutting blades 3A for cutting grass and a pair of impellers 3B for creating air flow in a per se known manner.

The mode of operation of the electric mower 1 of the illustrated embodiment is described in the following. When the blade lever 16 is pushed against the cross rod 13 by an operator, the blade motor 8 is driven, and the blade 3 rotates.

When the blade 3 rotates, an upward air flow is generated by the impellers 3B, and forwarded to the grass bag 23 via the chute 22. This air flow creates a negative pressure in the cavity 7 so that air is drawn from the atmosphere via the air inlet 21 formed in a front part of the main body 2 of the mower 1. The air drawn from the air inlet 21 passes through a gap defined between the upper housing 2a and the motor cover 67 as indicated by Y on the one hand, and through the gap defined between the motor support plate 38 and the blade housing 2b as indicated by X on the other hand. After passing through these gaps, the air drawn from the air inlet 21 flows into the cavity 7 via the gap between the lower surface of the motor support plate 38 and the upper surface of the blade housing 2b created by spacing the motor support plate 38 from the upper surface of the blade housing 2b by the rubber bushes 36. The air flow that has reached the cavity 7 is directed into the chute 22 along with the air in the cavity 7 entraining grass clippings therein.

The advantages of the mower 1 of the illustrated embodiment are discussed in the following. Heat generated in the blade motor 8 and the control unit 10 is transmitted to the upper surface of the main body 40 of the motor support plate 38 and the upper surface of the extension 42 of the motor support plate 38. As the motor support plate 38 is made of metallic material which is a good conductor of heat, the heat is transmitted to the lower surface of the motor support plate 38, and dissipated to the surrounding air from the lower surface of the motor support plate 38. Thereby, the blade motor 8 and the control unit 10 can be favorably cooled during the operation of the mower 1.

The motor support plate 38 supporting the blade motor 8 and the control unit 10 is provided with fins 84 on the lower surface thereof. Owing to the increase in the heat dissipating surface of the motor support plate 38, the control unit 10 and the blade motor 8 can be favorably cooled.

In particular, when the fins 84 are provided on the lower surface of the extension 42, preferably directly under the control unit 10, the heat generated in the control unit 10 can be efficiently cooled. Typically, the control unit 10 is relatively vulnerable to an excessively high temperature.

The overall thickness of the main body 40 of the motor support plate 38 is increased as compared to the remaining part of the motor support plate 38 so that the heat generated in the blade motor 8 can be favorably transmitted to the motor support plate 38, and dissipated to the surrounding air via a large surface area.

A part of the air introduced into the air passage A via the air inlet 21 is passed through the space defined between the lower surface of the motor support plate 38 and the upper surface of the blade housing 2b, the fins 84 as well as the remaining part of the lower surface of the motor support plate 38 can be favorably cooled.

A part of the air introduced into the air passage A via the air inlet 21 is passed through the space defined between the lower surface of the upper housing 2a and the upper surface of the motor cover 67 so that the control unit 10 and the blade motor 8 can be favorably cooled via the motor cover 67.

As the fins 84 extend in the fore and aft direction, the air flow introduced from the air inlet 21 can be passed along the surface of the extension 42 with a minimum amount of obstruction.

Since the blade motor 8 and the control unit 10 are received in a substantially enclosed chamber defined by the motor cover 67 and the motor support plate 38, contamination and damage of the blade motor 8 and the control unit 10 due to dust, moisture and other foreign matters can be avoided. Furthermore, by forming the motor cover 67 with plastic, it is possible to form the motor cover 67 inexpensively and lightweight. The gravitational center of the mower 1 can be lowered by forming the motor cover 67 with plastic or other light weight material so that the handling of the mower 1 may be improved. Since the motor cover 67 can be readily removed by disengaging the engagement features 66 from the corresponding engagement claws 65, the servicing of the blade motor 8 and the control unit 10 can be facilitated. If the motor cover 67 is made of metallic material, the heat dissipation via the motor cover 67 can be enhanced.

When the blade motor 8 is driven, heat is generated in the coils 60C of the stator 60. Since the protruding surface of the upper annular boss 44 is in contact with the coils 60C and/or the core, the heat generated in the coils 60C is efficiently transferred to the upper annular boss 44, and the heat generated in the blade motor 8 can be efficiently dissipated. Further, owing to the annular configuration of the projecting surface of the upper annular boss 44, the stator 60 can be cooled in a uniform manner.

Since the motor support plate 38 is made of aluminum, heat is favorably transmitted to the entire part of the motor support plate 38. Therefore, the heat generated in the blade motor 8 and the control unit 10 is readily conducted to the lower surface of the motor support plate 38, and the blade motor 8 and the control unit 10 can be favorably cooled.

The motor support plate 38 may be made of copper or iron. Further, the motor support plate 38 may be made of metal containing aluminum, copper or iron. Since aluminum, copper, and iron are metals with high thermal conductivity, the heat can be transmitted to the entire surface of the motor support plate 38 in an efficient manner.

Furthermore, in the present embodiment, since the motor support plate 38 is made of aluminum, the electric mower 1 can be constructed lightweight and inexpensively.

Furthermore, the air flow indicated by Y or the air flow passing through the space between the motor cover 67 and the upper housing 2a is induced by the rotation of the blade 3, this air flow contributes to the cooling of the blade motor 8 and the battery 20. Further, the air flow indicated by Y also passes through the space defined between a rear part of the lower surface of the motor support plate 38 and the upper surface of the blade housing 2b. Therefore, the rear side of the blade motor 8 is also cooled by the air flow passing through the space between the motor cover 67 and the upper housing 2a.

As shown in FIG. 2, the motor support plate 38 is attached to the blade housing 2b via a plurality of rubber bushes 36. Therefore, vibrations caused by the blade motor 8 are insulated from the blade housing 2b so that the noise emitted from the mower 1 can be minimized, and the repeated application of stress to the main body 2 can be minimized.

An air flow passing through the space defined between the lower surface of the motor support plate 38 and the upper surface of the blade housing 2b is also induced by the rotation of the blade 3, and this air flow contributes to the cooling of the blade motor 8 and the battery 20. Since the air admitted from the air inlet 21 is directly conducted to the lower surface of the motor support plate 38, the fins 84 are exposed to the fresh air which is not heated by any other part of the mower 1 so that the control unit 10 can be particularly favorably cooled.

Although the present invention has been described in terms of a preferred embodiment thereof, it is obvious to a person skilled in the art that various alterations and modifications are possible without departing from the scope of the present invention.

For instance, the air inlet 21 may be provided in a side part or a rear part of the main body 2. In such a case, the extension 42 may be extended from the main body 40 in the direction of the air inlet 21, and the fins 84 may also be aligned with the direction to the air inlet 21 for an optimum effect.

Also, the contact between the stator 60 of the blade motor 8 and the upper annular boss 44 may not be strictly direct, but a sheet or layer of material, preferably made of a high thermal conductivity may be interposed between the stator 60 and the upper annular boss 44.

The invention claimed is:

1. An electric mower comprising:
a blade housing defining a cavity opening out downward and a vertical passage extending centrally upward from the cavity;
a metallic motor support plate attached to a part of the blade housing defining an upper end of the vertical passage and provided with an extension extending beyond the vertical passage in a horizontal direction;
an electric motor attached to the motor support plate and having an output shaft extending downward through an opening formed in the motor support plate;
a blade attached to a lower end of the output shaft;
a control unit mounted on an upper surface of the extension for controlling the electric motor; and
an upper housing attached to an upper end of the blade housing to define an air passage in cooperation with an upper surface of the blade housing,
wherein the air passage communicates with the atmosphere via an air inlet defined at least partly by the upper housing, and the air passage includes a gap defined between the upper surface of the blade housing and at least a part of a lower surface of the extension, the gap communicating with the vertical passage.

2. The electric mower according to claim 1, wherein a plurality of fins are provided on at least a part of a lower surface of the motor support plate.

3. The electric mower according to claim 2, wherein the fins are provided on at least a part of a lower surface of the extension of the motor support plate.

4. The electric mower according to claim 3, wherein the control unit is attached to an upper surface of the part of the extension provided with the fins.

5. The electric mower according to claim 1, wherein fins aligning with a direction toward the air inlet are provided on at least a part of the lower surface of the extension.

6. The electric mower according to claim 1, further comprising a motor cover attached to an upper surface of the motor support plate to define a chamber receiving the electric motor and the control unit therein.

7. The electric mower according to claim 1, wherein the motor support plate is attached to the upper surface of the blade housing via a plurality of rubber bushes so that the rubber bushes create the gap by spacing the motor support plate from the upper surface of the blade housing.

8. The electric mower according to claim 1, wherein the electric motor consists of a permanent magnet motor including a stator and a rotor, the stator being substantially in direct contact with the motor support plate.

9. The electric mower according to claim 8, wherein the motor support plate is provided with an upper annular boss formed on an upper surface of the motor support plate, and a top end surface of the upper annular boss is substantially in direct contact with the stator.

10. The electric mower according to claim 9, wherein the motor support plate is further provided with a lower annular boss formed on a lower surface of the motor support plate, and the output shaft of the motor is supported by a pair of bearings provided in the opening of the motor support plate in an axially spaced apart relationship.

* * * * *